May 29, 1962 G. E. MEGEL ET AL 3,036,317
SCREW SLOTTING ATTACHMENT FOR AUTOMATIC LATHES
Filed April 22, 1958 3 Sheets-Sheet 1

INVENTORS
GUILLAUME E. MEGEL &
HENRI MANCIA

BY Wenderoth, Lind + Ponack
Attys.

INVENTORS
GUILLAUME E. MEGEL &
HENRI MANCIA

May 29, 1962  G. E. MEGEL ET AL  3,036,317
SCREW SLOTTING ATTACHMENT FOR AUTOMATIC LATHES
Filed April 22, 1958  3 Sheets-Sheet 3
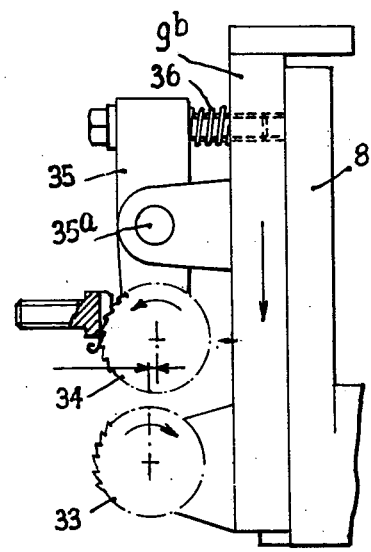
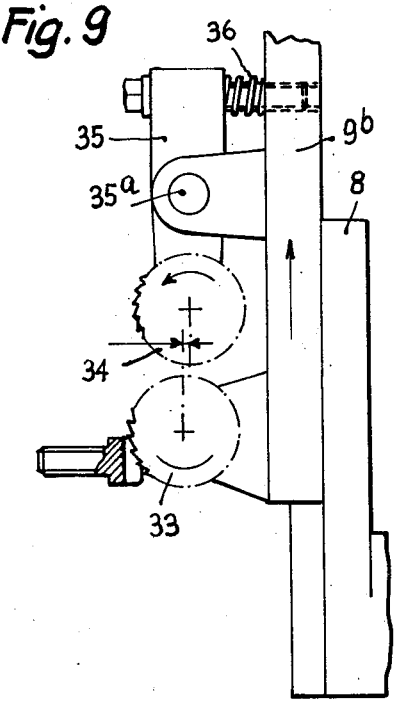
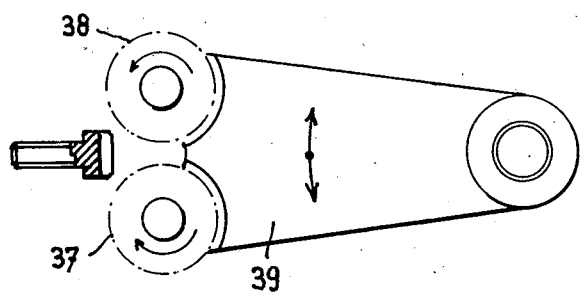
INVENTORS
GUILLAUME E. MEGEL
HENRI MANCIA
BY Wenderoth, Lind & Ponack
Attys.

United States Patent Office 3,036,317
Patented May 29, 1962

3,036,317
SCREW SLOTTING ATTACHMENT FOR
AUTOMATIC LATHES
Guillaume Ernest Megel, 54 Rue Industrielle, and Henri Mancia, 121 Rue Industrielle, both of Moutier, Switzerland
Filed Apr. 22, 1958, Ser. No. 731,575
Claims priority, application Switzerland June 10, 1954
9 Claims. (Cl. 10—5)

This invention relates to a method of slotting screw heads, and to a screw slotting attachment for an automatic lathe for producing slots in screw heads according to the method.

This application is a continuation-in-part of our application Serial No. 513,858 of June 7, 1955 and now abandoned.

The screw slotting attachments which have heretofore been incorporated in automatic lathes to produce slots in the heads of screws operate to produce slots either by moving the screws against a stationary rotary cutter, or by moving a rotary cutter against a stationary screw along an axis which is perpendicular to the longitudinal axis of the screw. In both of these types of slotting operations, it is impossible to prevent the formation of a burr as illustrated in FIG. 1 of the accompanying drawings when the rotary cutter is moved once across the diameter of the screw head to produce the slot. Obviously, such a burr is detrimental to efficient use of the screw, so that it is necessary for one manufacturing screws to perform a separate finishing operation to remove such burrs.

The present invention has for its principal object a method for slotting screws in a manner which will eliminate the formation of a burr on the screw after the slotting operation is finished.

Another object of the invention is to provide an attachment for carrying out such a method. The attachment includes means for holding the screw during the cutting of the screw blank, and means for moving the screw holder into register with the cutting tools during the formation of the slot.

In a preferred embodiment of the apparatus according to the invention there are provided two cutters at the point at which the slotting operation is to be performed, these cutters being positioned such that the teeth on the cutters face each other during the rotation of the cutters. The cutters are keyed onto two spindles rotating in opposite directions and held in a slider which is mounted for reciprocal movement. The apparatus operates to hold the screw in a fixed position, and to cut the slot by first moving one cutter across the entire diameter of the screw head from the periphery of the screw head toward the center thereof for cutting substantially the entire slot, and then moving the second rotary cutter across the entire diameter of the screw head from the periphery towards the center thereof in the opposite direction to the first cutter to form a finishing cut for the slot. The slot thus obtained is smooth and there is no burr formed at the end of the finished cut.

The invention will be more clearly understood from the following description and the appended claims, together with the accompanying drawings, in which FIG. 1 shows a screw head in which a slot has been cut by means of a conventional milling cutter;

FIGS. 8 and 9 are elevation views, partly in section of a modification of the attachment of FIG. 6, showing the attachment in two stages of its operation; and FIG. 10 is a schematic illustration of a third embodiment of the attachment according to the invention.

Figure 1:
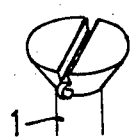
Figure 2:
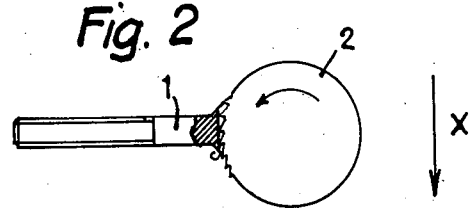
FIG. 2 is a side elevation partly in section of a milling cutter in the process of producing the cut shown in FIG. 1.

In the conventional screw slotting method as illustrated in FIG. 2, the slot is cut in the head of the screw 1 by means of a single cutter which rotates in a plane containing the axis of the screw and which moves in the direction of the arrow $x$ in FIG. 2 across a diameter of the screw head along a line perpendicular to the screw axis. The slot is made by a single cut by the cutter which rotates in only one direction. A screw is thus obtained in which there is formed a burr at the end of the slot, as shown in FIG. 1.

Figure 4:
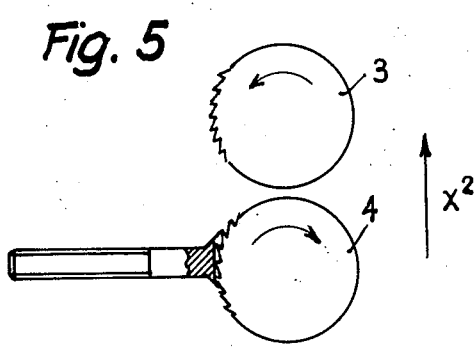
FIGS. 4 and 5 illustrate the two steps of cutting the slot according to the method of the present invention.
Figure 3:
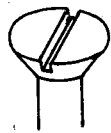
FIG. 3 is a perspective view of a screw head in which a slot has been cut by means of two cutters in accordance with the method of the present invention.
Figure 5:
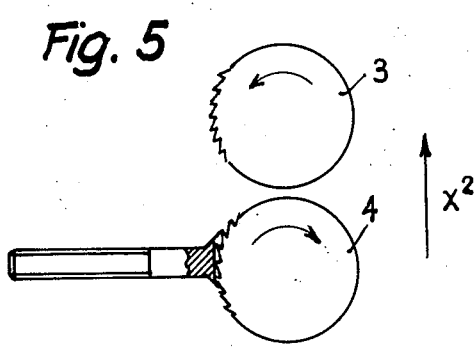

According to the method of the present invention, a screw slot can be formed in which there is no burr left at the end of the slot. As illustrated in FIGS. 4 and 5, the method consists of the first step of causing a first rotary cutter 3 and the screw head to move once relative to each other along the entire length of a diameter of the screw head with the periphery of the cutter 3 moving relative to the screw head along a perpendicular to the longitudinal axis of the screw and in the direction of its rotation from the periphery of the screw head at one end of the diameter toward the center of the screw head. This forms substantially the entire slot. As can be seen, the first rotary cutter has teeth on the periphery thereof which are directed in the direction of rotation of the rotary cutter 3. The next step is to cause the second rotary cutter 4 and the screw head to move once relative to each other along the entire length of the slot formed by the first cutter with the periphery of the second cutter 4 moving relative to the screw along a perpendicular to the longitudinal axis of the screw and in the direction of its rotation from the periphery of the screw head at the opposite end of the diameter from the end at which the first rotary cutter 3 commenced its movement for forming a finishing cut for the slot. It will be seen from the figures that the second rotary cutter has teeth on the periphery thereof directed in the direction of rotation of the second rotary cutter. As illustrated in FIGS. 4 and 5, the rotary cutters move in the directions indicated by arrows $x^1$ and $x^2$ and the screw is fixed.

In practice, the first rotary cutter 3, because it takes most of the material out of the slot, becomes dull in a relatively short period of time. It is for this reason that the burr is left at the end of the slot. The second rotary cutter 3, on the contrary, takes only a small amount of material from the bottom of the slot, and it therefore remains sharp for a much longer period of time than does the first rotary cutter. Because it remains sharp, it not only cuts away the burr left by the first rotary cutter 3, but it does not leave a burr at the end of the slot where it completes the finishing cut.

Figure 6:
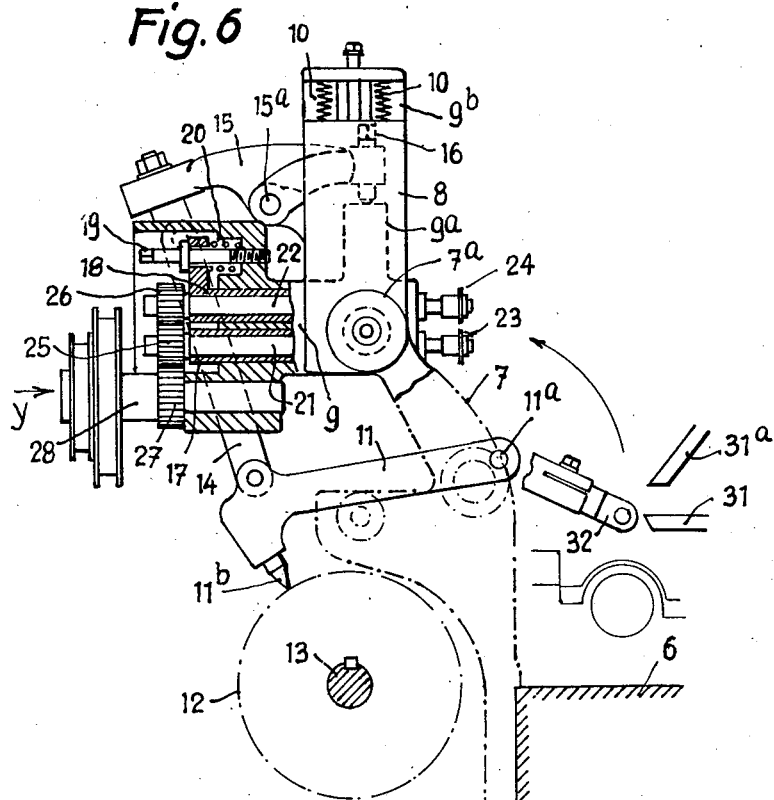
FIG. 6 is an elevation view, partly in section, showing a portion of an automatic lathe incorporating a screw slotting attachment according to the present invention.
Figure 7:
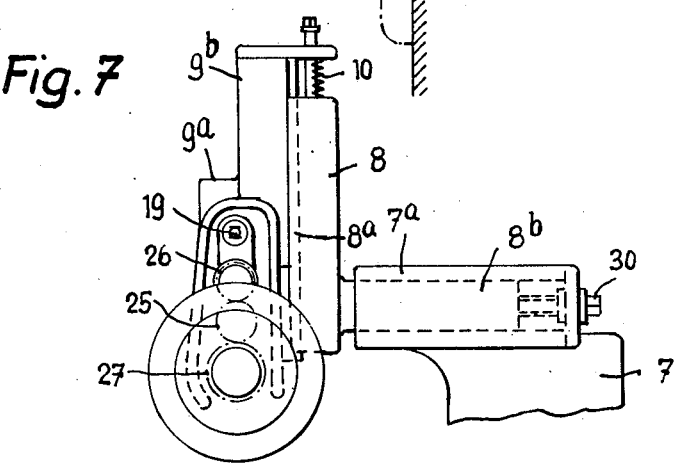
FIG. 7 is an elevation view of the attachment according to the present invention viewed in the direction of the arrow y shown in FIG. 6.

An embodiment of the apparatus for carrying out this method is illustrated in FIGS. 6 and 7. The frame of an automatic lathe is partly illustrated in FIG. 6 and is designated by the reference numeral 6. To said frame is secured a carrier 7 which in turn has thereon a support 8 for the screw slotting attachment. The support 8 has therein a vertical slideway 8a in which is slidably fitted a slider 9b. The slider 9b forms a part of a carriage 9 to which is attached two springs 10 which urge the carriage 9 upwardly relative to the support 8. A control mechanism is associated with the slider 9b to cause it to shift downwardly against the action of the two springs 10. This control mechanism includes an actuating lever 11 pivotally secured at 11a to the frame of the lathe and having a projection 11b thereon bearing against a control cam 12. The control is schematically illustrated by the circle shown in broken lines in FIG. 6. The cam 12 is mounted on a camshaft 13 which is conventional in automatic lathes. The lever 11 is connected to an actuating lever 15 by means of a connecting rod 14. The lever 15 is pivotally mounted at 15a, and has an adjustable screw 16 on the end thereof opposite to the end to which connecting rod 14 is connected. The adjustable screw 16 bears on a shoulder 9a on the slider 9b.

On the lower portion of the carriage 9 are mounted two sleeves 17 and 18, the sleeve 17 being fixed, while the sleeve 18 is adjustable axially of its length by means of adjusting screw 19. Spring 20 acts against the sleeve 18 in a direction opposite to the direction in which the sleeve is moved by tightening the screw 19. Within the two sleeves are rotatably mounted two cutter spindles 21 and 22, the ends of which project beyond the support 8 and have mounted thereon rotary cutters 23 and 24. On the ends adjacent the sleeves 17 and 18 are mounted gears 25 and 26 which mesh with each other, and which in turn are driven by a gear 27 meshed with gear 25. Gear 27 is mounted on shaft 28 which is rotated by a belt from the driveshaft of the automatic lathe. By means of this arrangement, the spindles 21 and 22 are driven in opposite directions.

The teeth on the rotary cutters 23 and 24 face in the direction of rotation of their respective rotary cutters, while the rotary cutters are substantially co-planar.

On the lower end of support 8 is a laterally projecting arm 8b (FIG. 7) which is slidably mounted in a guide sleeve 7a which is fixed on the carrier 7. An adjusting screw 30 bearing against the end of arm 8b provides means for adjusting the position of support 8 together with all the parts carried thereon along the length of sleeve 7a.

There is also schematically illustrated certain of the parts for machining, threading and cutting the screws from the screw blanks. There is shown the machining chisel 31, the cutting chisel 31a and the member 32 for conveying the screw blank.

In operation, the front end of the bar to be machined into the screw is subjected to the steps of cutting its periphery by means of the chisel 31 to form the stem of the screw and cutting the thus formed stem from the bar. The conveyor member 32 then moves to bring the blank into operative position relative to the rotary cutters 23 and 24. The cam 12 acts to pivot the lever 15, thus causing the slider 9b to move downwardly and then upwardly relatively to the screw blank held by the conveyor 32. This causes the cutter 24 to move completely across the head of the screw blank, and then causes the cutter 23 to move through the slot as formed by the cutter 24 to finish the slot and remove the burr formed by the cutter 24.

FIGS. 8 and 9 illustrate a modified embodiment of the screw slotting attachment. In this modification, the spindle carrying a cutter 33 is mounted directly on the slider 9b, while the spindle carrying the cutter 34 is mounted on an arm 35 which is pivotally mounted at 35a on the slider 9b. Spring 36 is positioned between the end of the arm 35 opposite the cutter 34 and the slider 9b and is held in position around an adjusting screw 36a. Thus, the arm 35 may be adjusted to shift the axis of the cutter 34 away from the vertical plane passing through the axis of the cutter 33 as shown in FIG. 8. By means of this modification, the cutter 34 can be adjusted to cut substantially all of the slot, on its downward travel, and the cutter 33 can be adjusted to make the finishing cut on the slot to remove the burr left by the cutter 34 and to leave no burr on its own.

A further modification is illustrated in FIG. 10 in which two cutter carrying spindles 37 and 38 are mounted on a carrier 39 which is pivoted around a fixed pivot 40. The cam, connecting rod and lever arrangement is modified to reciprocate the carrier 39, during which operation the cutters on the spindles 37 and 38 produce a slightly concave slot. As with the other embodiments of the attachments, the slot is produced without a burr.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:

1. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, means for rotating said spindles in opposite directions, and means for moving one of said spindles and the revolving cutter thereon over the entire diameter of the head of the screw in said screw holding means in the operative direction of said cutter teeth for forming substantially all of the slot, and then moving the other of said spindles and the revolving cutter thereon over the entire diameter of the screw head in the opposite direction for finishing the slot.

2. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, means for rotating said spindles in opposite directions, and means for moving one of said spindles and the revolving cutter thereon over the entire diameter of the head of the screw in said screw holding means in the operative direction of said cutter teeth for forming substantially all of the slot, and then moving the other of said spindles and the revolving cutter thereon over the entire diameter of the screw head in the opposite direction for finishing the slot.

3. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, adjustable means in which one of said spindles is carried, said adjustable means being movable transversely to the longitudinal axis of the spindle carried by said adjustable means, means for rotating said spindles in opposite directions, and means for moving one of said spindles and the revolving cutter thereon over the entire diameter of the head of the screw in said screw holding means in the operative direction of said cutter teeth for forming substantially all of the slot, and then moving the other of said spindles and the revolving cutter thereon over the entire diameter of the screw head in the opposite direction for finishing the slot.

4. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, fixed means in which each of said spindles is carred for holding said spindles fixed relative to each other, means for rotating said spindles in opposite directions, and means for moving one of said spindles and the revolving cutter thereon over the entire diameter of the head of the screw in said screw holding means in the operative direction of said cutter teeth for forming substantially all of the slot, and then moving the other of said spindles and the revolving cutter thereon over the entire diameter of the screw head in the opposite direction for finishing the slot.

5. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, a common support for said two spindles, means for rotating said spindles in opposite directions, and means for reciprocating said common support for moving one of said spindles and the revolving cutter thereon over the entire diameter of the head of the screw in the screw holding means in the operative direction of the cutter teeth for forming substantially all of the slot, and then moving the other of said spindles and the revolving cutter thereon over the entire diameter of the screw head in the opposite direction for finishing the slot.

6. A screw slotting attachment comprising two adjacent rotary cutters each having the same cutting width and rotatable in opposite directions and lying in a single plane in which a slot is to be cut in the head of the screw, said means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, a common support for said two spindles, said support being pivoted about a fixed point, means for rotating said spindles in opposite directions, and means for reciprocatingly pivoting said common support around the fixed pivot for moving one of said spindles and the revolving cutter thereon over the entire diameter of the head of the screw in the screw holding means in the operative direction of the cutter teeth for forming substantially all of the slot, and then moving the other of said spindles and the revolving cutter thereon over the entire diameter of the screw head in the opposite direction for finishing the slot.

7. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, sleeves in which said spindles are rotatably mounted, gearing on said spindles for causing the rotation of the spindles in opposite directions, a support in which said sleeves are rigidly mounted, said support being reciprocal in a direction perpendicular to the axes of said cutters, one of said spindles and the revolving cutter thereon over the entire diameter of the head of the screw in the screw holding means in the operative direction of the cutter teeth for forming substantially all of the slot, and then moving the other of said spindles and the revolving cutter thereon over the entire diameter of the screw head in the opposite direction for finishing the slot.

8. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, sleeves on which said spindles are rotatably mounted, gears on each of said spindles engaged with each other for causing the rotation of the spindles in opposite directions, a support in which said sleeves are rigidly mounted, said support being reciprocal in a direction perpendicular to the axes of said cutters, a revolvable cam, lever means connected to said support and actuated by said cam for reciprocating said support, said cam having a profile limiting the movement of one of said spindles and the revolving cutter thereon over the entire diameter of the head of the screw in the screw holding means in the operative direction of the cutter teeth for forming substantially all of the slot, and then moving the other of said spindles and the revolving cutter thereon over the entire diameter of the screw head in the opposite direction for finishing the slot, a slideway on which said support is adjustably slidable in a direction perpendicular to the direction of reciprocation of the support and parallel with the plane of the cutters, and means for adjusting the longitudinal position of at least one spindle in its sleeve.

9. A screw slotting attachment comprising two adjacent rotary cutters each having the same cutting width and rotatable in opposite directions and lying in a single plane in which a slot is to be cut in the head of the screw, means for holding a screw with the axis of the screw perpendicular to the cutters and with the head of the screw between the rotary cutters and substantially in line with the peripheries of said cutters which move toward each other, the two cutters each having teeth facing in the direction of rotation of the respective cutters, two spindles, one of said spindles being closer to said screw holding means than the other, each spindle rigidly carrying one of said cutters, means for rotating said spindles in opposite directions, a support for one of said cutter-carrying spindles, a pivot fixed to said support, an intermediate support pivotally secured to said support and in which the second cutter-carrying spindle is rotatably mounted, adjustable means for defining the angular location of the intermediate support with reference to the first mentioned support, and means for moving said support moving one of said spindles and the revolving cutter thereon over the entire diameter of the head of the screw in the screw holding means in the operative direction of the cutter teeth for forming substantially all of the slot, and then moving the other of said spindles and the revolving cutter thereon over the entire diameter of said screw head in the opposite direction for finishing the slot.

References Cited in the file of this patent

UNITED STATES PATENTS

| 358,158 | Lidbeck | Feb. 22, 1887 |
| 1,269,370 | Botenstein | June 11, 1918 |
| 1,931,699 | Hubbell | Oct. 24, 1933 |